Figure 1:
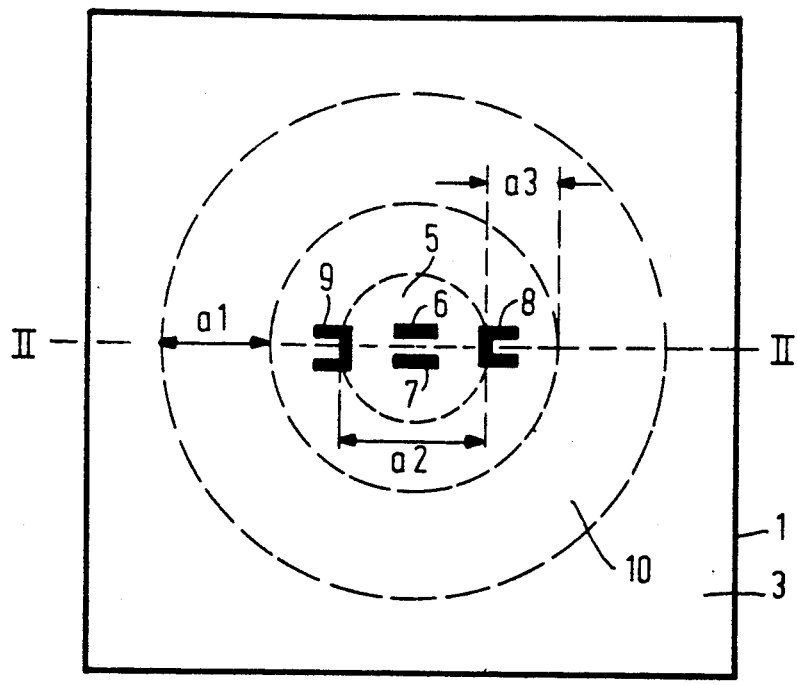

United States Patent [19]

Graeger et al.

[11] Patent Number: 5,024,097
[45] Date of Patent: Jun. 18, 1991

[54] PRESSURE SENSOR COMPRISING A SILICON BODY

[75] Inventors: Volker Graeger, Buchholz; Rolf U. D. Kobs, Tornesch, both of Fed. Rep. of Germany

[73] Assignee: U.S. Philips Corporation, New York, N.Y.

[21] Appl. No.: 411,193

[22] Filed: Sep. 20, 1989

Related U.S. Application Data

[63] Continuation of Ser. No. 148,745, Jan. 27, 1988, abandoned.

[30] Foreign Application Priority Data

Jan. 28, 1987 [DE] Fed. Rep. of Germany ....... 3702412

[51] Int. Cl.⁵ .............................................. G01L 9/06
[52] U.S. Cl. ....................................... 73/727; 73/721; 338/4
[58] Field of Search ................. 73/721, 727, 708, 754, 73/DIG. 4; 338/4

[56] References Cited

U.S. PATENT DOCUMENTS

| | | | |
|---|---|---|---|
| 4,080,830 | 4/1977 | Eckstein et al. | 73/719 |
| 4,444,054 | 4/1984 | Schaff, Jr. | 73/721 |
| 4,528,855 | 7/1985 | Singh | 338/4 |

Primary Examiner—Donald O. Woodiel

[57] ABSTRACT

A pressure sensor comprising a silicon body (1) which is arranged on a substrate (2). The silicon body (1) comprises a cavity (4) in the form of a blind hole, or enclosed chamber which thus forms a diaphragm (5). On the outer surface thereof there is arranged a Wheatstone bridge consisting of piezoresistive resistance elements (6, 7, 8, 9). The voltage/pressure characteristic of this pressure sensor exhibits a non-linearity of more than 1% in the case of pressure loads in excess of 250 bar. This non-linearity must be reduced. Therefore, a further cavity (10) is provided in the silicon body (1) on both sides of the resistance elements (8, 9) arranged at the edge of the diaphragm (5).

9 Claims, 2 Drawing Sheets

PRESSURE SENSOR COMPRISING A SILICON BODY

This is a continuation of application Ser. No. 148,745, filed Jan. 27, 1988, now abandoned.

The invention relates to a pressure sensor for static pressure loads comprising a silicon body which is arranged on a substrate and which comprises a cavity in the form of a blind hole which opens towards the substrate, thus forming a diaphragm which extends parallel to the base of the silicon body and on the outer surface of which there is arranged a Wheatstone bridge consisting of piezoresistive resistance elements, two resistance elements thereof being centrically arranged on the diaphragm whilst the other two resistance elements are arranged at the edge of the diaphragm.

A pressure sensor of this kind is known from the magazine "Siemens Forschungs- und Entwicklungsberichte", Vol. 13, 1984, No. 6, Springer-Verlag, pages 294 to 302. This sensor consists of a monocrystalline silicon body which is arranged on a substrate in the form of a glass plate. The outer surface of the silicon body which is remote from the substrate is referred to as the base. This base, being situated in the (111) crystal plane, contains the outer surface of the diaphragm. The piezoresistive resistance elements are integrated on the silicon body (by diffusion). The piezoresistive resistance elements forming a Wheatstone bridge are arranged at the areas of the diaphragm where the highest mechanical stresses occur in order to obtain a correspondingly large electric signal.

On the basis of the piezoresistive effect, the resistance of each resistance element having the resistance value R changes in accordance with equation:

$$dR/R = \pi r \sigma r + \pi t \sigma t,$$

where $\sigma r$ and $\sigma t$ are the radial and the tangential mechanical stress in the silicon body, respectively, $\pi r$ and $\pi t$ are the radial and the tangential piezoresistive constant, respectively, and dR is the value of the resistance variation. The piezoresistive constants are defined by the selection of the resistance material and the crystal orientation.

The resistance elements are arranged so that the variations of the resistance are equal as regards absolute value, the resistance variation of two elements being the same and opposed to that of the other pair of elements. In order to achieve this, the resistance elements must be arranged so that in the case of pressure loading either
  (a) the mechanical stresses at the corresponding resistance elements have opposite signs and the piezoresistive constants are approximately equal for all elements, or
  (b) the mechanical stresses have the same sign for all resistances and the signs of the piezoresistive constants at the corresponding resistance elements are opposite.

For diaphragms which extend parallel to the (111) crystal plane, the resistance elements must be arranged in accordance with paragraph (a).

From the cited publication it is known that for a pressure load below 250 bar the (111) crystal plane is selected as the base of the silicon body because of the high tensile strength. For pressure loads in excess of 250 bar, however, the electric voltage/pressure characteristic becomes non-linear to an unacceptable degree. A non-linearity of more than 1% occurs. This high non-linearity is due to the fact that very high compressive stresses act on the outer surface at the centre of the diaphragm (compression) and no tensile stresses act on the diaphragm and very small tensile stresses act outside the diaphragm. This mechanical stress distribution causes a non-uniform resistance variation in the measuring bridge, which produces the cited non-linearity. Therefore, for a high pressure load in the known pressure sensors the (100) crystal plane is selected as the base, the resistance elements then being arranged as specified in paragraph (b) above. For the manufacture of pressure sensors this implies a second manufacturing process, i.e. for high pressure loads silicon bodies having the (100) crystal plane as their base must be manufactured, whilst for low pressure loads silicon bodies having the (111) crystal plane as their base must be manufactured.

Also known are pressure sensors which comprise a silicon body where the resistance elements are not integrated (by diffusion) but are constructed instead as thin-film resistors. Between the silicon body, comprising a cavity in the form of a blind hole or enclosed chamber, and the thin-film resistors there is provided an insulating layer, for example of silicon nitride or silicon oxide. It has been found that, when a pressure load in excess of 250 bar acts on this pressure sensor, the electric voltage/pressure characteristic becomes non-linear to an inadmissible degree.

It is also to be noted that EP-A No. 0 111 640 discloses a pressure sensor where the resistance elements are arranged as specified in paragraph (b) above. The pressure sensor comprises four cavities in the form of blind holes which are arranged in a circle and which form four diaphragms. The outer surfaces of the diaphragms extend parallel to the (100) crystal plane. Outside the circular arrangement, in the vicinity of each diaphragm, there are arranged four resistance elements, that is to say in a position where the largest difference occurs between the tangential mechanical stress and the radial mechanical stress. The use of four cavities in the form of blind holes instead of one large cavity in the form of a blind hole aims to increase the breaking strength of the pressure sensor.

It is an object of the invention to provide a pressure sensor in which the non-linearity of the electric voltage/pressure characteristic is reduced in the case of high pressure loads.

In a pressure sensor of the kind set forth this object is achieved in that in the silicon body a further cavity which opens towards the substrate is provided on both sides of the resistance elements arranged at the edge of the diaphragm.

In this pressure sensor at least one further cavity is provided at the edge of the diaphragm in addition to the cavity in the form of a blind hole for the diaphragm. The additional cavity or cavities must in any case be provided at the area of the outer resistance elements. Due to the at least one additional cavity, a substantially larger mechanical tensile force occurs on the base in comparison with the known pressure sensor. As a result, the non-linearity of the electric voltage/pressure characteristic is reduced. Therefore, the pressure sensor in accordance with the invention can be used not only for pressure loads below 250 bar, but also for pressure loads amounting to as much as approximately 1000 bar.

For example, two cavities in the form of longitudinal grooves can be provided adjacent the resistance elements situated at the edge of the diaphragm. A further possibility consists in forming the blind-hole cavity so as to have a circular cross-section and in arranging the further cavity as an annular groove around the blind-hole cavity. A simple construction is thus obtained. This is because, using etching techniques, the annular groove can be formed during the same manufacturing step as the diaphragm.

In a further elaboration of the invention, the depths of the blind-hole cavity and the annular groove are substantially equal, the distance between the two cavities being approximately equal to half the diameter of the diaphragm, the width of the annular groove having a value between one half of the diameter and the full diameter of the diaphragm. As a result, a non-linearity of less than 0.1% is obtained for the characteristic, as has been demonstrated by experiments performed with pressure loads of from 300 to 1200 bar.

A pressure sensor may be constructed so that the diaphragm extends parallel to the (111) crystal plane of the silicon body and the resistance elements are diffused therein.

A further possibility consists in constructing the resistance elements as thin-film resistance elements. In that case the crystal orientation or the crystal plane of the base of the silicon body is arbitrary.

Figure 2:
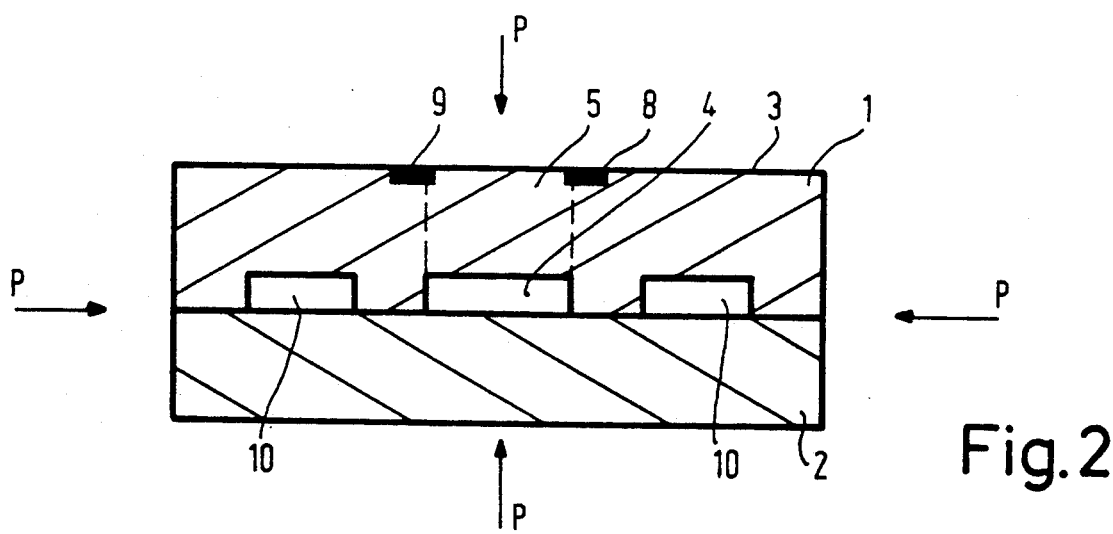
Figure 3:
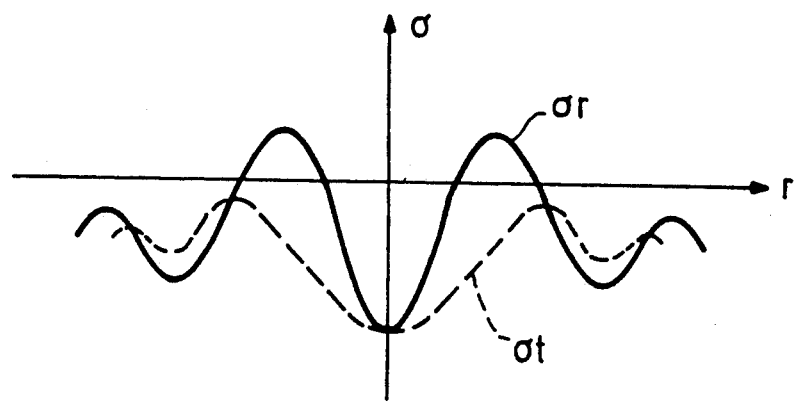
Figure 4:
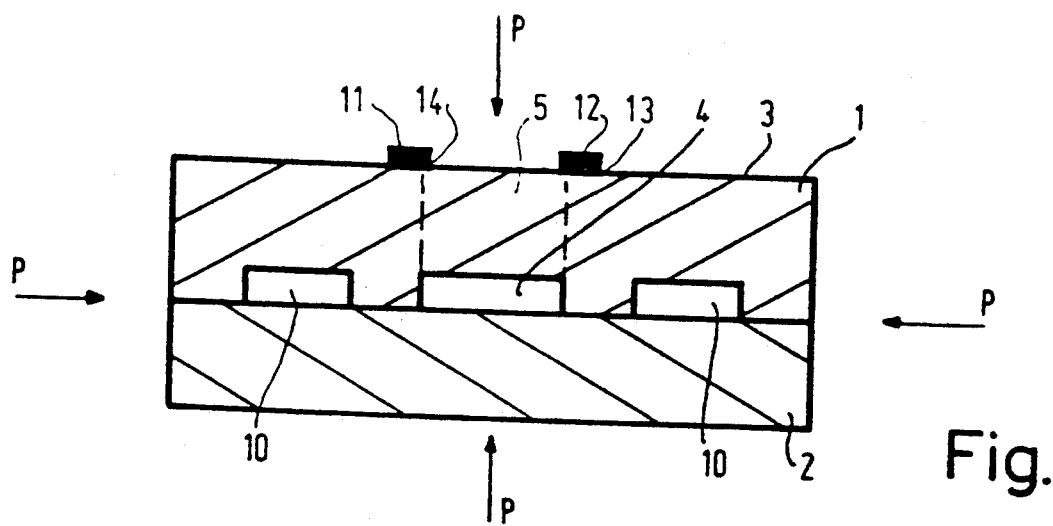

Embodiments in accordance with the invention will be described in detail hereinafter with reference to the drawings. Therein:

FIG. 1 is a plane view of a pressure sensor comprising a silicon body with integrated resistance elements, FIG. 2 is a longitudinal sectional view of the pressure sensor, taken along the line II—II in FIG. 1, FIG. 3 shows the radial and the tangential mechanical stress variation of the pressure sensor along the line II—II in FIG. 1, and FIG. 4 is a longitudinal sectional view of a pressure sensor comprising a silicon body and thin-film resistance elements.

The pressure sensor shown in the FIGS. 1 and 2 comprises a square silicon body 1 which is arranged on a substrate 2, for example by anode bonding. The substrate 2 may be, for example a glass plate. The base 3 of the silicon body 1 is situated in a (111) crystal plane and is formed by the outer surface which is remote from the substrate 2. In the silicon body 1 there is provided a cavity 4 in the form of a blind hole or enclosed chamber having a circular cross-section. The cavity faces substrate 2. As a result of this cavity 4 there is formed a circular diaphragm 5 which extends parallel to the (111) crystal plane and on which there are arranged four resistance elements 6 to 9.

The resistance elements 6 and 7 are formed by parallel longitudinal strips at the centre of the diaphragm 5. The resistance elements 8 and 9 are formed by U-shaped strips arranged in parallel at the edge of the diaphragm 5 so that the opening of the U-shaped resistance elements 8 and 9 is remote from the diaphragm 5. The opening of the resistance elements 8 and 9 could alternatively face the diaphragm 5. The four resistance elements 6 to 9 are integrated in the silicon body 1 and are connected to electrical supply leads (not shown) so that a Wheatstone bridge can be formed by means of these elements.

The pressure sensor described thus far is known and is used for pressure loads up to 250 bar. For higher pressure loads a non-linearity in excess of 1% of the electric voltage/pressure characteristic occurred. The non-linearity is reduced in accordance with the invention in that a further cavity is provided in the silicon body 1. This further cavity is arranged around the cavity 4 in the form of an annular groove 10 having a U-shaped cross-section, which groove faces the side of the substrate 2. Preferably, the depth of the blind-hole cavity 4 and the annular groove 10 are approximately equal. The width a1 of the annular groove 10 should be between one half of the diameter a2 and the full diameter a2 of the diaphragm 5 and the distance a3 between the two cavities 4 and 10 would be approximately equal to one half of the diameter a2 of the diaphragm 5. Practical tests have revealed that such pressure sensors produce a non-linearity of the electric voltage/pressure characteristic of less than 0.1% in the case of hydrostatic pressure loads of from 300 to 1200 bar.

For such a pressure sensor FIG. 3 shows the variation of the mechanical stress on the base 3 along the line II—II for the radial and tangential mechanical stress components in FIG. 1. The tangential stress variation $\sigma t$ is represented by a broken line. In the radial stress variation $\sigma r$, denoted by a non-interupted line, positive radial stresses occur between the diaphragm and the annular groove. Because this positive radial stress is much greater in the pressure sensor in accoradnce with the invention than in the known pressure sensor, the non-linearity of the characteristic will be significantly reduced.

FIG. 4 shows a further pressure sensor. Except for the arrangement of the resistance elements, the construction of this pressure sensor is identical to that shown in the FIGS. 1 and 2. The silicon body 1, being arranged on the substrate 2, again comprises a cavity 4 in the form of a blind hole having a circular cross-section. The annular groove 10 is arranged around the cavity 4. The cavity 4 causes the diaphragm 5 to be formed. In this pressure sensor the crystal orientation is arbitrary, i.e. the base 3 may be situated in an arbitrary crystal plane.

Instead of integrated resistance elements, the pressure sensor shown in FIG. 4 comprises four thin-film resistance elements. Two of the thin-film resistance elements are formed as longitudinal strips which are arranged in parallel at the centre of the diaphragm 5 in the same way as shown in the FIGS. 1 and 2. The other two thin-film resistance elements, 11 and 12, are formed by U-shaped strips arranged in parallel at the edge of the diaphragm. The thin-film resistance elements 11 and 12 are separated from the silicon body 1 by a respective insulating layer 13, 14, which may consist of, for example silicon nitride or silicon oxide. The four thin-film resistance elements are connected to electrical supply leads (not shown) so that these elements can again form a Wheatstone bridge.

The pressure sensor shown in FIG. 4 produces only a slight non-linearity of the electric voltage/pressure characteristic in the case of high pressure loads.

What is claimed is:

1. A pressure sensor for static pressure loads comprising a silicon body (1) which is arranged on a substrate (2) and which comprises a cavity (4) in the form of a blind hole or enclosed chamber which faces the substrate, thus forming a diaphragm (5) which extends parallel to the base of the silicon body and on the outer surface of which there is arranged a Wheatstone bridge including piezoresistive resistance elements (6 to 9; 11, 12), two resistance elements (6, 7) thereof being centrally arranged on the diaphragm whereas the other two resistance elements (8, 9; 11, 12) are arranged at the edge of the diaphragm,
  wherein a separate cavity (10) which faces the substrate (2) is provided in the silicon body on both sides of the resistance elements (8, 9; 11, 12) arranged at the edge of the diaphragm, and
  all said resistance elements reside in a more centrally located portion of said silicon body than said separate cavity.

2. A pressure sensor as claimed in claim 1, wherein the blind-hole cavity (4) has a circular cross-section and the separate cavity is an annular groove (10) that surrounds the blind-hole cavity.

3. A pressure sensor as claimed in claim 2, wherein the depths of the blind-hole cavity (4) and the annular groove (10) are substantially equal, the distance (a3) between the two cavities (4, 10) is approximately equal to half the diameter (a2) of the diaphragm (5), and the width (a1) of the annular groove (10) has a value between one half of the diameter (a2) and the full diameter (a2) of the diaphragm (5).

4. A pressure sensor as claimed in claim 3, wherein the diaphragm (5) is situated parallel to the (111) crystal plane of the silicon body (1) and the resistance elements (6 to 9) are diffused therein.

5. A pressure sensor as claimed in claim 3, wherein the resistance elements are formed thin-film resistance elements (11, 12).

6. A pressure sensor as claimed in claim 2, wherein the resistance elements are thin-film resistance elements (11, 12).

7. A pressure sensor as claimed in claim 2, wherein the diaphragm (5) is situated parallel to the (111) crystal plane of the silicon body (1) and the resistance elements (6 to 9) are diffused therein.

8. A pressure sensor as claimed in claim 1, wherein the resistance elements are thin-film resistance elements (11, 12).

9. A pressure sensor as claimed in claim 1, wherein the diaphragm (5) is situated parallel to the (111) crystal plane of the silicon body (1) and the resistance elements (6 to 9) are diffused therein.

* * * * *